(12) United States Patent
Cheong et al.

(10) Patent No.: US 12,728,480 B2
(45) Date of Patent: Sep. 8, 2026

(54) LASER WELDING APPARATUS AND METHOD OF CONTROLLING THE SAME

(71) Applicant: SK ON CO., LTD., Seoul (KR)

(72) Inventors: Hoemin Cheong, Daejeon (KR); Jae Hun Kim, Daejeon (KR); Hyeong Won Kim, Daejeon (KR); Sung Chel Yoon, Daejeon (KR); Ki Dong Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 825 days.

(21) Appl. No.: 18/102,084

(22) Filed: Jan. 27, 2023

(65) Prior Publication Data

US 2024/0033846 A1 Feb. 1, 2024

(30) Foreign Application Priority Data

Jul. 26, 2022 (KR) ........................ 10-2022-0092506

(51) Int. Cl.

| | |
|---|---|
| ***B23K 26/03*** | (2006.01) |
| ***B23K 26/042*** | (2014.01) |
| ***B23K 26/21*** | (2014.01) |
| ***B23K 31/12*** | (2006.01) |
| *B23K 26/08* | (2014.01) |
| *B23K 101/36* | (2006.01) |

(52) U.S. Cl.
CPC .......... *B23K 26/032* (2013.01); *B23K 26/042* (2015.10); *B23K 26/21* (2015.10); *B23K 31/125* (2013.01); *B23K 26/0869* (2013.01); *B23K 2101/36* (2018.08)

(58) Field of Classification Search
None
See application file for complete search history.

(56) References Cited

U.S. PATENT DOCUMENTS 9,041,508 B2 5/2015 Glickman et al.
2014/0017795 A1 1/2014 Kim
(Continued)

FOREIGN PATENT DOCUMENTS

CN 111131723 A 5/2020
KR 10-2015-0062223 A 6/2015
(Continued)

OTHER PUBLICATIONS

Extended European Search Report isseud by the EPO for Application No. 23154285.3, dated Jun. 19, 2023.

*Primary Examiner* — Katheryn A Malatek
(74) *Attorney, Agent, or Firm* — IP & T GROUP LLP

(57) ABSTRACT

A laser welding apparatus includes a stage on which a first structure and a second structure, targets of a laser welding process, are seated, a vision camera located above the stage and obtaining a sample image indicating a welding target region in which the first structure and the second structure come into contact, and a controller adjusting setting parameters of the vision camera. The controller obtains a sample RGB value from each of a plurality of regions of interest selected from the sample image, compares the sample RGB value with a reference RGB value obtained from each of reference regions of interest defined in the same location as the plurality of regions of interest in a predetermined reference image, to adjust at least one of the setting parameters, and sets the vision camera.

11 Claims, 13 Drawing Sheets

(56) References Cited

U.S. PATENT DOCUMENTS

| | | | | |
|---|---|---|---|---|
| 2017/0043431 | A1 | 2/2017 | Kuba et al. | |
| 2019/0198848 | A1* | 6/2019 | Onodera | H01M 50/50 |
| 2020/0160498 | A1 | 5/2020 | Coker et al. | |
| 2022/0009026 | A1 | 1/2022 | Wagner et al. | |
| 2022/0088696 | A1 | 3/2022 | Kim et al. | |
| 2022/0234139 | A1* | 7/2022 | Scheible | G02B 6/262 |

FOREIGN PATENT DOCUMENTS

| | | | |
|---|---|---|---|
| KR | 10-2036544 | B1 | 10/2019 |
| KR | 10-2020-0011509 | A | 2/2020 |

* cited by examiner

| CLASSIFICATION | EXPOSURE TIME | GAIN | ISO |
|---|---|---|---|
| DEF. | 30us | LOW | 200 |
| SET1 | 100us | HIGH | 400 |
| SET2 | 1ms | LOW | 800 |
| SET3 | 10ms | LOW | 1600 |
| SET4 | 50ms | HIGH | 200 |
| SET5 | 500ms | HIGH | 400 |
| SET6 | 1s | HIGH | 1600 |

FIG. 13

LASER WELDING APPARATUS AND METHOD OF CONTROLLING THE SAME

CROSS-REFERENCE TO RELATED APPLICATION(S)

This application claims benefit of priority to Korean Patent Application No. 10-2022-0092506 filed on Jul. 26, 2022 in the Korean Intellectual Property Office, the disclosure of which is incorporated herein by reference in its entirety.

BACKGROUND

1. Field

The present disclosure relates to a laser welding apparatus and a method of controlling the same.

2. Description of Related Art

A battery used as a power source for electric vehicles, energy storage systems, and the like includes a plurality of battery modules, and each of the plurality of battery modules may include a plurality of battery cells. A process of manufacturing a plurality of battery cells and a process of manufacturing a battery module using the plurality of battery cells may include a laser welding process for bonding a plurality of structures to each other. In the laser welding process, it is necessary to increase the yield of the process by accurately designating a target area to be welded and proceeding with the welding.

SUMMARY

An aspect of the present disclosure is to provide a laser welding apparatus for performing welding by accurately designating a welding target region by optimizing setting parameters of a vision camera to identify the welding target region to be welded, before performing a laser welding process, and a method of controlling the same.

According to an aspect of the present disclosure, a laser welding apparatus includes a stage on which a first structure and a second structure, targets of a laser welding process, are seated, a vision camera located above the stage and obtaining a sample image indicating a welding target region in which the first structure and the second structure come into contact, and a controller adjusting setting parameters of the vision camera. The controller obtains a sample RGB value from each of a plurality of regions of interest selected from the sample image, compares the sample RGB value with a reference RGB value obtained from each of reference regions of interest defined in the same location as the plurality of regions of interest in a predetermined reference image, to adjust at least one of the setting parameters, and sets the vision camera.

According to an aspect of the present disclosure, a method of controlling a laser welding apparatus includes seating a first structure and a second structure to be welded on a stage for manufacturing a battery, generating a reference image using a vision camera located inside the stage and obtaining reference RGB values from respective reference regions of interest designated in the reference image, obtaining a sample image including a welding target region in a welding object including structures such as the first structure and the second structure, obtaining sample RGB values of a plurality of respective regions of interest in the sample image, and adjusting at least one of setting parameters of the vision camera until the sample RGB values fall within a predetermined range from the reference RGB values by comparing the sample RGB values and the reference RGB values.

BRIEF DESCRIPTION OF DRAWINGS

The above and other aspects, features, and advantages of the present disclosure will be more clearly understood from the following detailed description, taken in conjunction with the accompanying drawings, in which:

FIG. 13 is a diagram illustrating a method of controlling a laser welding apparatus according to an embodiment.

DETAILED DESCRIPTION

Details of other embodiments are included in the detailed description and drawings.

Advantages and features of the present disclosure, and obtaining methods thereof, will become clear with reference to the embodiments described below in detail in conjunction with the accompanying drawings. However, the present disclosure is not limited to the embodiments disclosed below and may be implemented in various different forms, and these embodiments are only provided such that the disclosure of the present disclosure is complete, and are provided to completely inform those skilled in the art of the scope of the invention to which the present disclosure belongs. The invention is only defined by the scope of the claims. Like reference numbers may refer to like elements throughout the specification.

Figure 1:
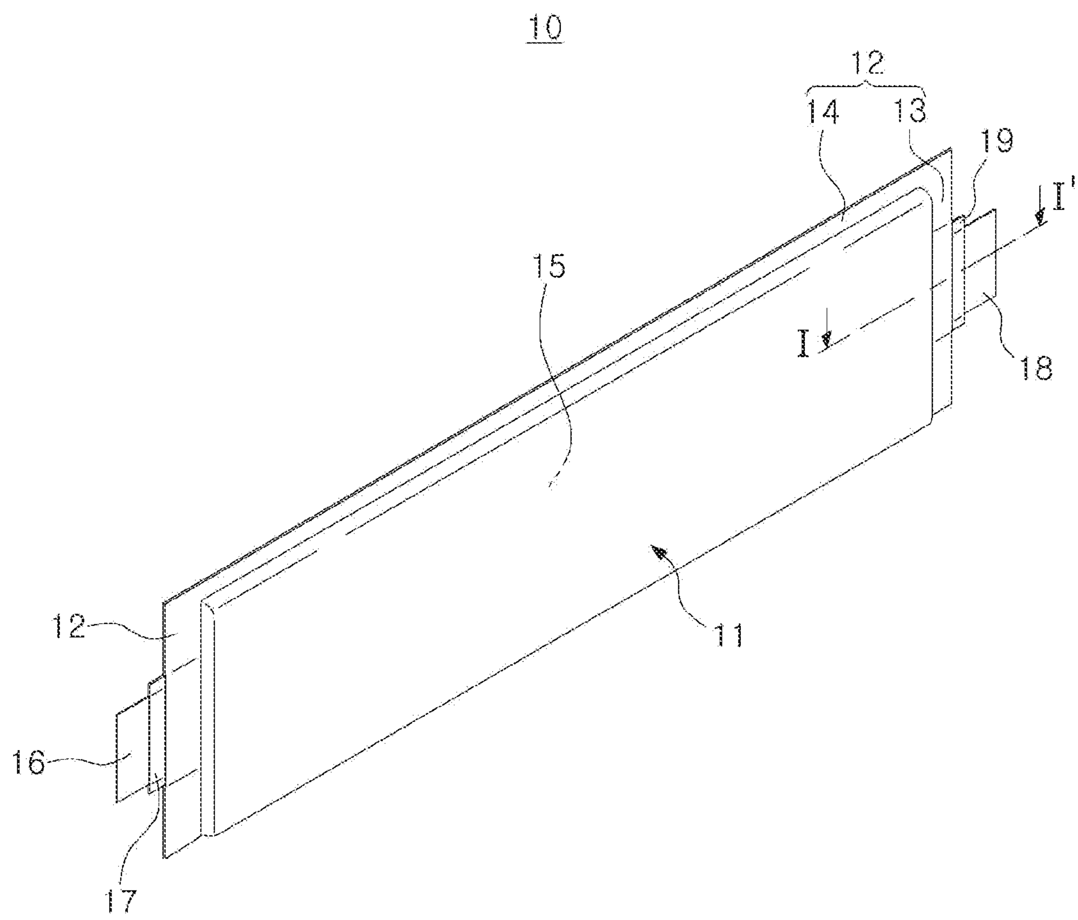
FIG. 1 is a diagram illustrating the appearance of a battery cell according to an embodiment.

FIG. 1 is a diagram illustrating the appearance of a battery cell according to an embodiment.

A battery cell 10 according to an embodiment illustrated in FIG. 1 may be a pouch type battery cell. The battery cell 10 may include an electrode structure accommodated inside a pouch 11, an electrolyte, and the like. The pouch 11 may include an accommodation space 15 accommodating the electrode structure, and a sealing portion 12 for sealing the accommodation space 15. The sealing portion 12 may have a flange shape extending to the outside of the accommodation space 15. In addition, the sealing portion 12 may be divided into a first sealing portion 13 where electrode tabs 16 and 18 are disposed, and a second sealing portion 14 surrounding the first sealing portion 13.

The electrode structure accommodated inside the pouch 11 may include a plurality of electrode plates, electrode connection parts extending from the electrode plates, and the like. The electrode plate may be divided into a positive electrode plate and a negative electrode plate. The positive electrode plate and the negative electrode plate are alternately disposed, and a separator may be inserted and disposed between the positive electrode plate and the negative electrode plate.

For example, the positive electrode plates may be connected to each other and connected to the positive electrode tab 16 exposed to the outside of the pouch 11, and the negative electrode plates may be connected to each other and connected to the negative electrode tab 18 exposed to the outside of the pouch 11. Insulators 17 and 19 may be disposed in respective regions of the positive electrode tab 16 and the negative electrode tab 18 exposed to the outside of the pouch 11. According to embodiments, the positive electrode plate and the negative electrode plate may have different areas, and for example, the area of the negative electrode plate may be larger than the area of the positive electrode plate.

The vision camera may generate an image by capturing a structure to be laser welded, for example, two or more battery cells 10 and a bus bar coupled with the two or more battery cells 10. However, the image generated by the vision camera may be created differently by setting parameters adjustable in the vision camera, for example, exposure time, gain, image filter, and the like, even in the case of photographing the same object. Therefore, to accurately designate a welding target region before proceeding with the laser welding process, it is necessary to optimize the setting parameters of the vision camera.

In an embodiment, a reference image in which a welding target region is accurately displayed is first generated using an Auto Position Alignment (APA) function, and setting parameters of the vision camera may be adjusted using the reference image. For example, when an object to be welded is disposed on the stage of the laser welding apparatus, a sample image in which the welding target region is displayed by photographing the object with a vision camera may be obtained. Thereafter, setting parameters of the vision camera may be optimized by comparing RGB values obtained from a plurality of respective regions of interest selected from the sample image and the reference image. Accordingly, the welding target region may be identified by capturing an object to be welded with a vision camera having optimized setting parameters, and a laser welding process may be performed. In addition, the defect rate may be reduced and the yield and stability of the battery module may be improved by resolving positional defects that may occur in the laser welding process and securing the stability of the process.

Figure 2:
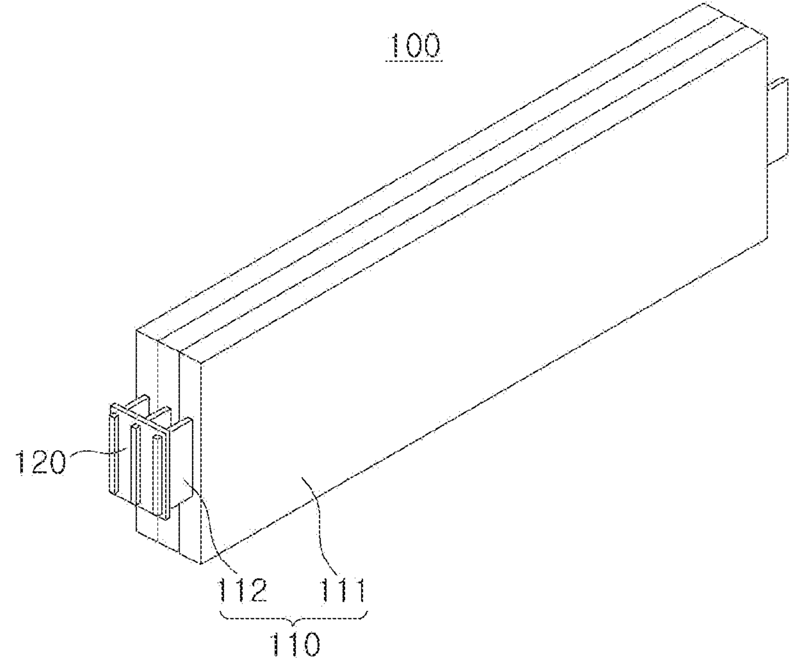
FIG. 2 is a diagram schematically illustrating a structure of coupling between battery cells and a bus bar in a battery module according to an embodiment.
Figure 3:
FIG. 3 is a diagram illustrating a partial area of a battery module according to an embodiment.
Figure 3:
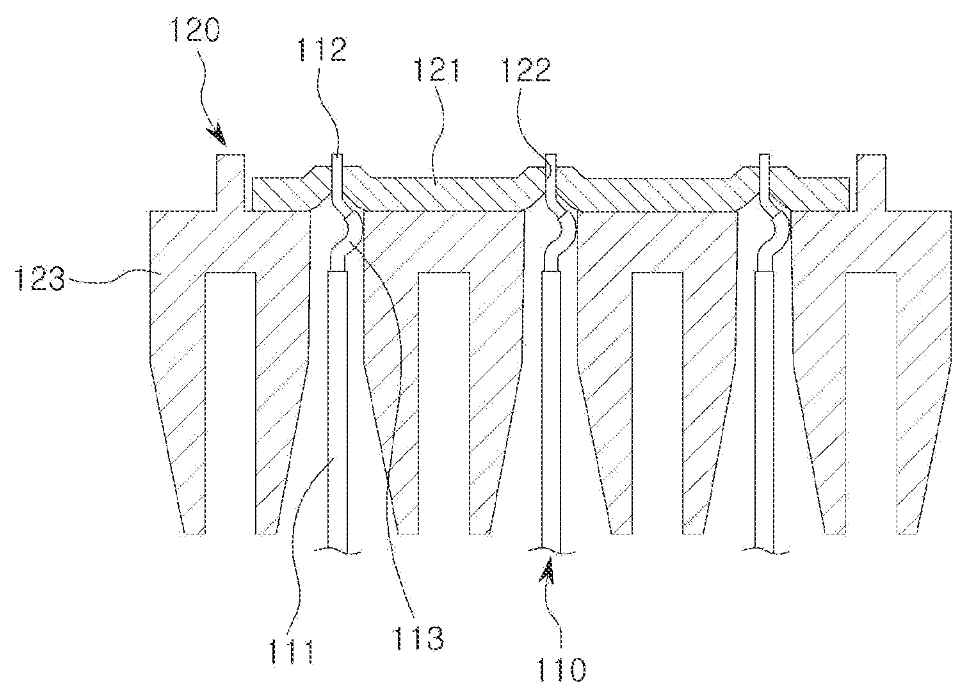

FIG. 2 is a diagram schematically illustrating a coupling structure between battery cells and a bus bar in a battery module according to an embodiment, and FIG. 3 is a diagram illustrating a partial area of the battery module according to an embodiment.

Referring to FIGS. 2 and 3, a battery module 100 according to an embodiment may include a plurality of battery cells 110, a bus bar 120 connecting the plurality of battery cells 110, and the like. The plurality of battery cells 110 may respectively have a structure similar to the structure of the embodiment described above with reference to FIG. 1. As an example, each of the plurality of battery cells 110 may include a pouch 111, an electrode tab 112 exposed to the outside of the pouch 111, and the like.

The bus bar 120 includes a bus bar plate and a plurality of holes formed in the bus bar plate, and electrode tabs 112 of each of the plurality of battery cells 110 may be inserted into each of the plurality of holes. For example, an electrode tab corresponding to a positive electrode or an electrode tab corresponding to a negative electrode in the plurality of respective battery cells 110 may be inserted into one bus bar 120. Therefore, the positive electrodes or negative electrodes of the plurality of battery cells 110 may be electrically connected to each other by the bus bar 120.

Referring to FIG. 3, in the battery module 100, the bus bar 120 may include a bus bar plate 121, a plurality of holes 122, an insulating member 123, and the like. The bus bar plate 121 is formed of a conductive material, and an electrode tab 112 connected to a positive electrode or a negative electrode in each of the plurality of battery cells 110 may be inserted into the plurality of holes 122. The electrode tab 112 is connected to the positive electrode or the negative electrode inside the pouch 111 and extends, and at least a portion of the electrode tab 112 may be surrounded by an insulating portion 113. As illustrated in FIG. 3, the electrode tab 112 and the insulating portion 113 may have a bent shape in some areas.

When the electrode tab 112 of each of the plurality of battery cells 110 is inserted into each of the plurality of holes 122, a welding process for fixing the bus bar 120 and the plurality of battery cells 110 may be performed. The welding process is a laser welding process using a laser and may be performed at the boundary between each of the plurality of holes 122 and the electrode tab 112, and may be performed in a state in which the electrode tab 112 is inserted into one of the plurality of holes 122 without changing the shape of the electrode tab 112.

When the laser welding process is completed, the electrode tabs 112 of each of the plurality of battery cells 110 may be fixed while being connected to the bus bar plate 121. For example, while the laser welding process is in progress, the laser may be irradiated at a predetermined angle with respect to the direction in which the electrode tab 112 extends.

To accurately perform the laser welding process and fix the bus bar plate 121 and the electrode tab 112, it is necessary to accurately target the position where the laser is irradiated. A laser welding apparatus according to an embodiment of the present disclosure may automatically perform a welding process by identifying a welding target region to be welded from an image captured by a vision camera. In addition, to accurately identify the welding target region, a pre-generated reference image and an image captured by the vision camera may be compared to adjust setting parameters of the vision camera to optimal values prior to the welding process. Therefore, the bus bar plate 121 and the electrode tab 112 may be securely connected and fixed by accurately irradiating the laser to the welding target region.

Figure 4:
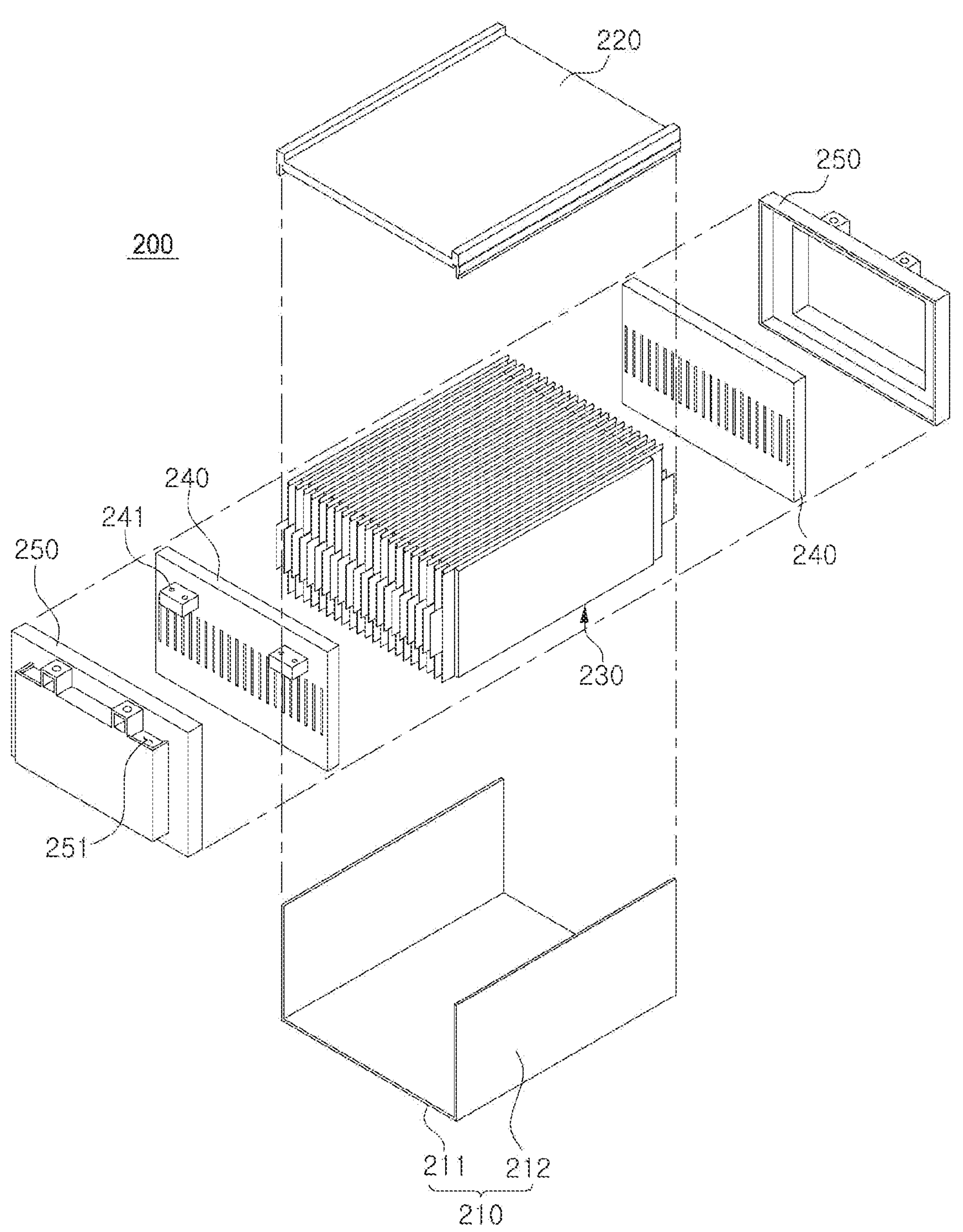
FIGS. 4 and 5 are diagrams illustrating a battery module according to an embodiment.
Figure 5:
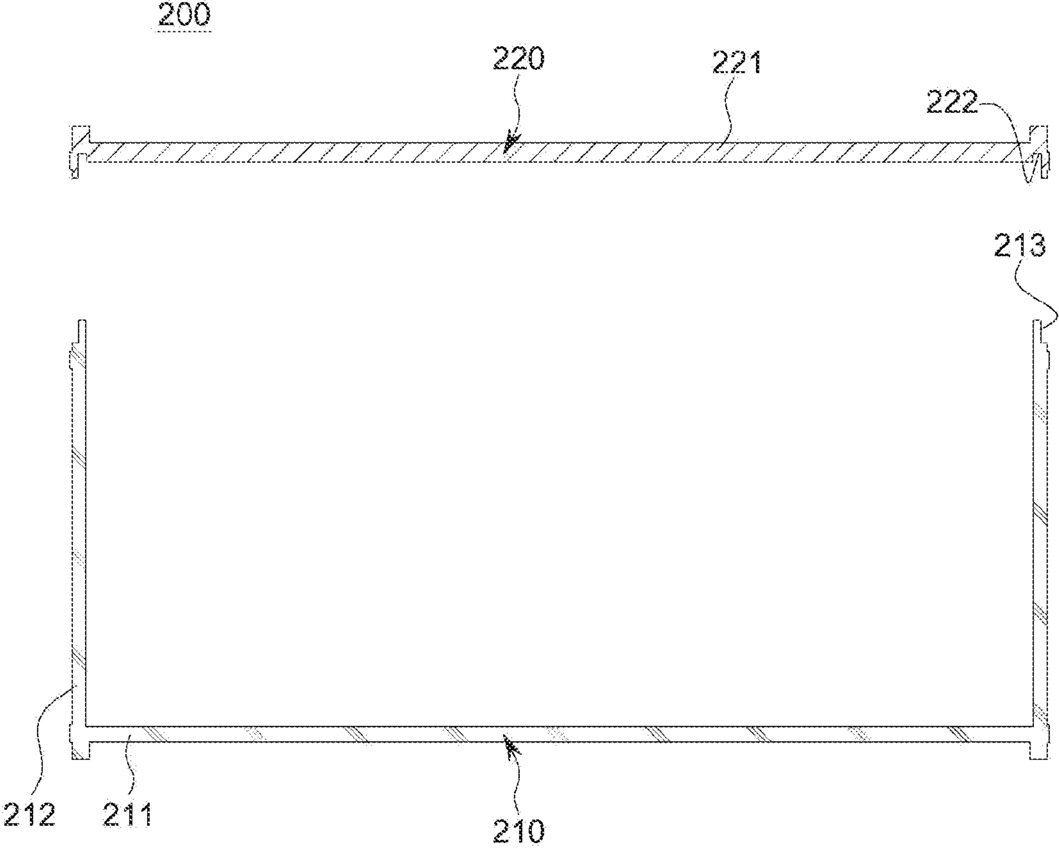

FIGS. 4 and 5 are diagrams illustrating a battery module according to an embodiment.

Referring to FIG. 4, a battery module 200 may include module housings 210 and 220, and a plurality of battery cells 230 accommodated inside the module housings 210 and 220. The plurality of battery cells 230 are disposed in a stacked state, and the module housings 210 and 220 may include a lower case 210 and an upper cover 220. The module housings 210 and 220 may have a shape with both ends open, and both open ends may be covered by end plates 250.

A bus bar 240 may be disposed between the end plate 250 and the plurality of battery cells 230. As described above, electrode tabs included in the plurality of respective battery cells 230 may be inserted into and fixed to a plurality of holes provided in the bus bar 240. The bus bar 240 may include a connection terminal 241 for providing electrical connection with external sources, and the connection terminal 241 may be exposed externally through an opening 251 of the end plate 250.

Referring to FIGS. 4 and 5 together, the lower housing 210 of the battery module 200 includes a lower plate 211 and a sidewall portion 212, and a protrusion 213 may be provided on an upper end of the sidewall portion 212. On the other hand, the upper cover 220 may include an upper plate 221, an insertion groove 222, and the like. The protrusion 213 of the lower housing 210 is inserted into the insertion groove 222 of the upper cover 220, and then a welding process is performed such that the lower housing 210 and the upper cover 220 may be coupled to each other.

A welding process for combining the lower housing 210 and the upper cover 220 is a laser welding process using a laser, and may be performed at a boundary between the lower housing 210 and the upper cover 220. Similar to the above description, while the laser welding process is in progress, the laser beam may be irradiated to be inclined by a predetermined angle with the surface of the sidewall portion 212 of the lower housing 210 where the boundary between the lower housing 210 and the upper cover 220 is present.

To accurately perform the laser welding process and fix the lower housing 210 and the upper cover 220, the irradiation position of the laser should be accurately targeted. The laser welding apparatus according to an embodiment may identify the boundary between the lower housing 210 and the upper cover 220 to which the laser is to be irradiated in the image taken by the vision camera, and automatically proceed with the welding process.

In addition, to accurately identify the boundary between the lower housing 210 and the upper cover 220, which is the welding target region, by comparing the reference image created in advance with the image taken by the vision camera, the setting parameters of the vision camera may be adjusted to optimal values before the welding process. Therefore, the laser may be accurately irradiated to the welding target region, and the reliability of the module housing and the battery module 200 including the same may be improved.

Figure 6:
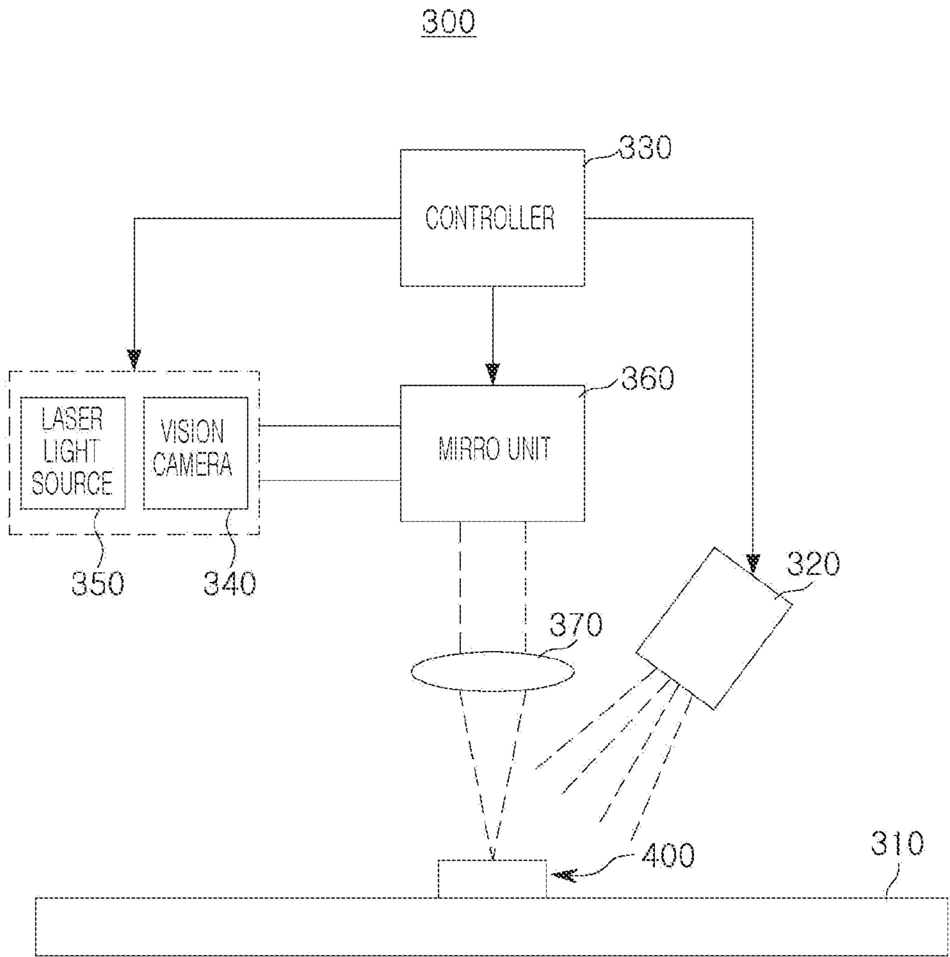
FIG. 6 is a schematic diagram illustrating a laser welding apparatus according to an embodiment.

FIG. 6 is a schematic diagram of a laser welding apparatus according to an embodiment.

Referring to FIG. 6, a laser welding apparatus 300 according to an embodiment may include a stage 310 on which a welding object 400 is seated, a lighting unit 320, a controller 330, a vision camera 340, a laser light source 350, a mirror unit 360, a lens 370, and the like. For example, the welding object 400 seated on the stage 310 may include a first structure and a second structure to be connected to each other by welding. When the laser welding apparatus 300 is used in the battery manufacturing process, the welding object 400 may include battery cells and bus bars, include the upper cover and the lower case of the module housing in which the battery module is accommodated, or may include a plurality of electrodes and electrode tabs included in one battery cell.

The vision camera 340 is disposed above the stage 310 and may acquire an image by photographing the welding object 400. For example, while the vision camera 340 captures the welding object 400 to be welded, the lighting unit 320 including a light source such as an LED may radiate light to the welding object 400 to be welded. The vision camera 320 may include a camera lens module, an image sensor, and the like. The controller 330 may control the lighting unit 320, the vision camera 340, the laser light source 350, the mirror unit 360, and the like.

The laser light source 350 emits laser light, and the laser light emitted from the laser light source 350 may be incident to the mirror unit 360 through the fiber and then irradiated to the welding object 400 through the lens 370. The laser light source 350, the mirror unit 360 and the lens 370 may provide a welding unit. The mirror unit 360 may include one or more mirrors that reflect laser light. For example, the mirror unit 360 allows light reflected from the welding object 400 to enter the vision camera 340 while the vision camera 340 captures the welding object 400. While the laser light source 350 emits laser light, the mirror unit 360 may allow the laser light to be incident to the welding object 400 to be welded such that the welding process proceeds.

In the embodiment illustrated in FIG. 6, the optical axis of the laser light passing through the lens 370 and irradiated to the welding object 400 to be welded is perpendicular to the upper surface of the stage 310, but the optical axis of the laser light irradiated to the welding object 400 to be welded may vary depending on the embodiment. For example, laser light may be irradiated at an angle that is not perpendicular to the upper surface of the stage 310, and in this case, the vision camera 340 may photograph the welding object 400 from above the welding object 400 in a direction perpendicular to the upper surface of the stage 310.

The vision camera 340 may create an image by photographing the welding object 400 to be welded before and after the laser welding process. For example, the controller 330 receives an image of the welding object 400 to be welded taken from the vision camera 340 after the laser welding process is performed, and based thereon, may determine whether or not the laser welding process is defective.

In addition, the controller 330 receives an image of the welding object 400 to be welded taken from the vision camera 340 before the laser welding process starts, and based thereon, may change the setting of the vision camera 340. For example, the controller 330 may identify a welding target region in an image of the welding object 400 captured by the vision camera 340, to adjust the positions of the mirror unit 360 and/or the lens 370, thereby changing the location where the laser light is irradiated. If the welding target region is not accurately identified in the image of the welding object 400 captured by the vision camera 340, the laser light is irradiated to a place other than the welding target region, and the defect rate of the laser welding process may increase.

To prevent the above problem, in an embodiment, the controller 330 may adjust at least one of setting parameters of the vision camera 340 before the start of the laser welding process, using an image of the welding object 400 taken by the vision camera 340. Even when photographing the same welding object 400, in the case in which setting parameters of the vision camera 340, for example, an exposure time, a gain, an image filter, or the like is changed, the degree to which the welding target region is identified in the image may vary. In an embodiment of the present disclosure, by first optimizing the setting parameters of the vision camera 340 before starting the laser welding process, the laser welding process may be performed after accurately specifying the welding target region in the welding object 400.

After optimizing the setting parameters of the vision camera 340, the controller 330 may obtain a result image displaying the welding target region by using the vision camera 340. The controller may control at least one of the laser light source 350, the mirror unit 360 and the lens 370 based on the result image such that the laser output from the laser light source 350 is irradiated to the welding target region accurately.

Figure 7:
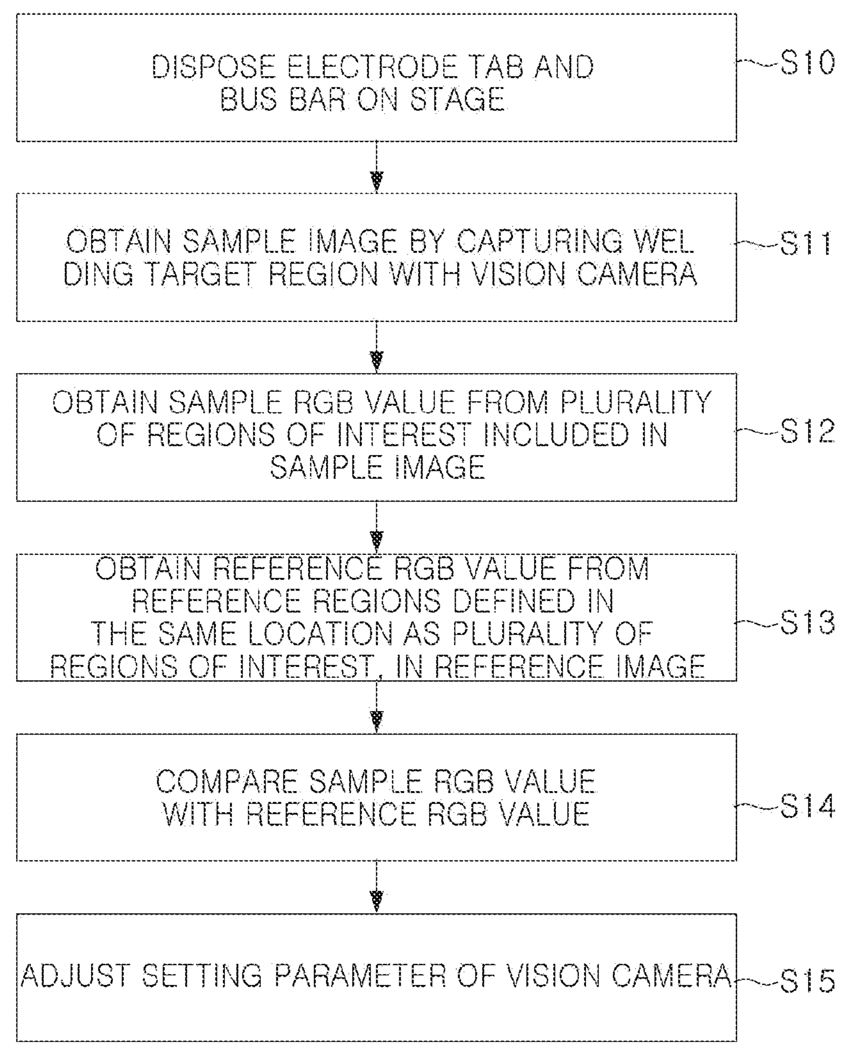
FIGS. 7 and 8 are flowcharts illustrating a method of controlling a laser welding apparatus according to an embodiment.
Figure 8:
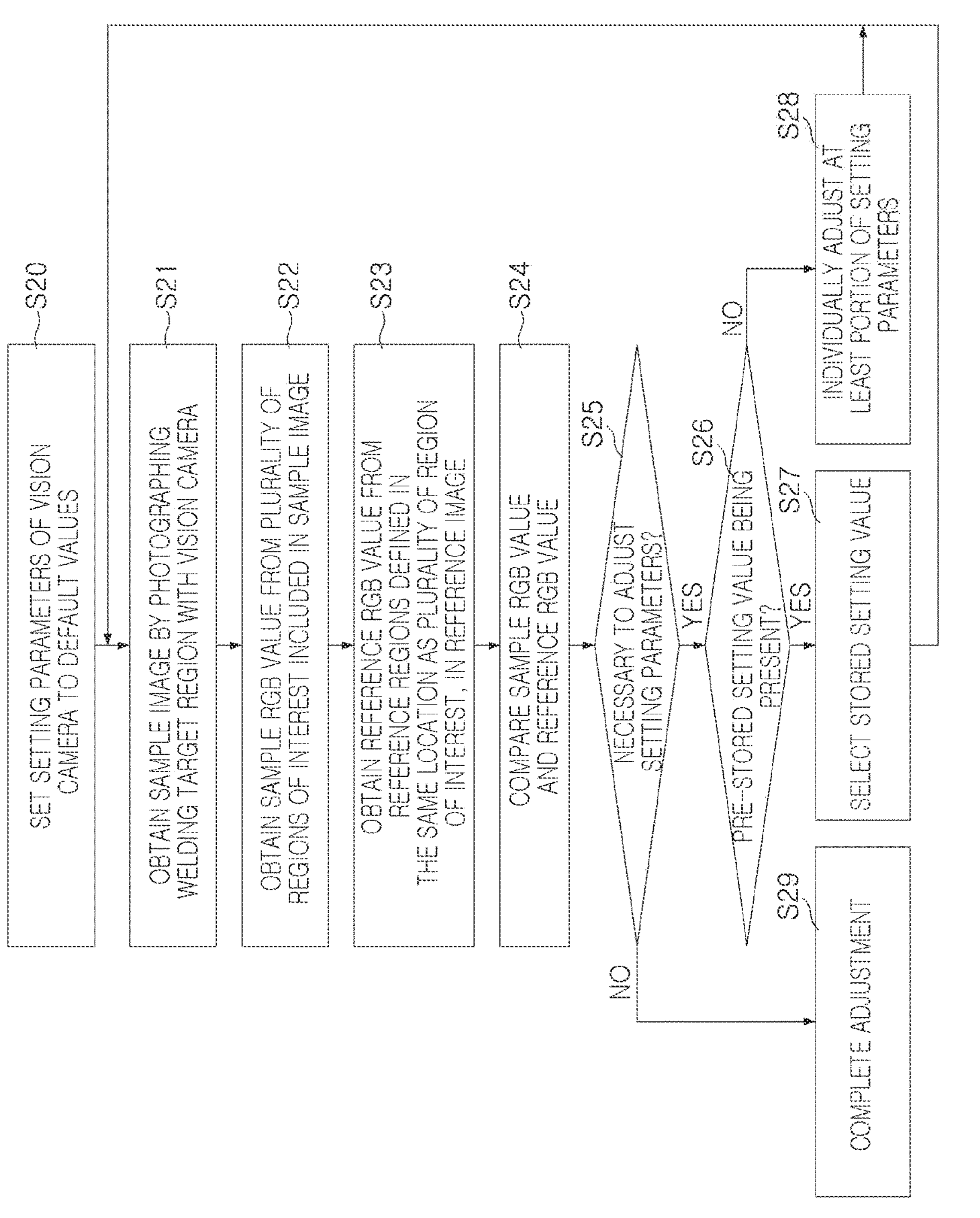

FIGS. 7 and 8 are flowcharts provided to describe a method of controlling a laser welding apparatus according to an embodiment.

First, referring to FIG. 7, an electrode tab and a bus bar to be welded may be disposed on a stage (S10). As described above with reference to FIGS. 2 and 3, the electrode tab may be disposed on the stage while being inserted into one of a plurality of holes formed in the bus bar. However, the welding object disposed on the stage may be variously modified according to embodiments, and for example, the lower case and the upper cover of the module housing according to the embodiment described with reference to FIGS. 4 and 5 may be disposed on the stage.

The vision camera included in the laser welding apparatus may obtain a sample image by photographing the welding target region (S11). For example, the welding target region is one of a plurality of holes included in the bus bar, and may include a boundary between the inner circumferential surface of the hole and the electrode tab. In operation S11, the setting parameters of the vision camera may be set to default values.

The controller may set a plurality of regions of interest (ROI) in the sample image, and may obtain sample RGB values from the plurality of respective regions of interest (S12). For example, the plurality of regions of interest may include a first region of interest, and at least one second region of interest having an area smaller than the area of the first region of interest and set within the first region of interest.

For example, the first ROI is set to include at least a portion of the welding target region, and the controller may identify the welding target region within the first ROI. When the first region of interest is set, a second region of interest may be set therein. For example, the controller may set a plurality of second regions of interest, and in this case, a welding target region to be welded may be located between some of the plurality of second regions of interest.

The sample RGB value may be an average RGB value calculated in a plurality of respective regions of interest. For example, an RGB average value calculated by the controller in the plurality of respective regions of interest may correspond to brightness.

Next, the controller sets a plurality of reference regions defined in the same location as the plurality of regions of interest, in the reference image stored in advance, and may obtain reference RGB values from the plurality of respective reference regions (S13). The reference image may be an image of the same welding object to be welded in the same location as the vision camera that captured the sample image. As an example, by applying the APA function while the vision camera captures the welding object, an image obtained when the APA score is the highest score may be stored as a reference image in internal and external memory of the controller.

A method for the controller to acquire the reference RGB values of the plurality of respective reference regions may be the same as the method for acquiring the sample RGB values in operation S12. For example, the controller may obtain an RGB average value of each of the plurality of reference regions as a reference RGB value. The controller compares the reference RGB values with the sample RGB values (S14), and according to the comparison result, may adjust at least one of setting parameters of the vision camera (S15). For example, the controller may compare sample RGB values and reference RGB values acquired from the respective ROIs and reference regions set in the same location.

For example, when the reference RGB value and the sample RGB value are the same, or when the difference between the reference RGB value and the sample RGB value is a predetermined reference difference or less, the controller may maintain the default settings without adjusting the setting parameters of the vision camera. On the other hand, when the reference RGB value and the sample RGB value are different or the difference therebetween is greater than the reference difference, the controller may adjust setting parameters of the vision camera. For example, the controller may change the exposure time, gain, sensitivity, or the like of the vision camera.

In a case in which the difference between the reference RGB value and the sample RGB value is greater than the reference difference, the controller may not accurately identify the welding target region based on the sample image. As an example, the welding target region should be identified as the boundary between the inner circumferential surface of the hole formed in the bus bar and the electrode tab inserted into the hole, but in the sample image, scratches formed on the surface of a bus bar formed of metal or an electrode tab may be mistakenly recognized as a welding target region. Therefore, defects may occur in the laser welding process and the stability of the battery module may deteriorate.

Meanwhile, when the exposure time, sensitivity, gain, and the like of the vision camera are adjusted such that the difference between the reference RGB value and the sample RGB value is the reference difference or less, a scratch or the like that may be misrecognized as a welding target region may not be expressed in the sample image. In detail, when the difference between the reference RGB value and the sample RGB value is less than or equal to the reference difference, while the welding target region may be identified in the sample image, other elements that may be misrecognized as welding target regions may not be clearly identified. In this manner, the controller may adjust the exposure time, sensitivity, gain, and the like of the vision camera to increase the discrimination of the welding target region.

Next, referring to FIG. 8, prior to starting welding, setting parameters of the vision camera may be set to default values (S20). Setting parameters of the vision camera may include exposure time, gain, sensitivity, and brightness and color of a camera light source mounted on the vision camera. When the setting parameters are set to default values, the vision camera may obtain a sample image by photographing the welding object seated on the stage (S21). For example, a welding target region to be irradiated with laser light in a welding process may be displayed on the sample image.

The controller of the laser welding apparatus sets a plurality of regions of interest in the sample image, and may obtain sample RGB values from the plurality of respective regions of interest (S22). For example, the sample RGB value is a value obtained by averaging R, G, and B values of pixels included in one ROI, and may correspond to the brightness of the ROI.

Next, the controller sets a plurality of reference regions in the pre-stored reference image, and may obtain reference RGB values from the plurality of respective reference regions (S23). Like the sample RGB values, the reference RGB values may be obtained by averaging R, G, and B values of pixels included in the reference region. Respective positions of the plurality of reference regions in the reference image may correspond to respective positions of the plurality of regions of interest in the sample image. In detail, the controller may set a plurality of reference regions in the reference image by referring to positions of a plurality of regions of interest selected in the sample image.

The controller may compare the sample RGB value and the reference RGB value (S24), and determine whether adjustment of setting parameters is necessary based on the comparison result (S25). For example, when the sample RGB value and the reference RGB value are different, or the difference between the sample RGB value and the reference RGB value is greater than the predetermined reference difference, the controller may determine that it is necessary to adjust setting parameters of the vision camera. In operation S24, the controller may compare the reference RGB value and the sample RGB value obtained from the reference region and the region of interest set in the same location in the respective reference image and sample image.

When it is determined in operation S25 that adjustment of the setting parameters is necessary, the controller may determine whether there are pre-stored setting values (S26). For example, the controller may store a combination of values applied to setting parameters of the vision camera in previous operations, as setting values, in a memory or the like. Depending on an embodiment, the controller may store a combination of values applied to the setting parameters a certain number of times or more, as a setting value, and may sort and store a plurality of setting values according to the number of applications. In addition, the controller may group and store setting values according to the type of welding object photographed by the vision camera, the shape of the welding target region, or the like.

When there are pre-stored setting values in operation S26, the controller may select and apply the stored setting values to the vision camera (S27). When a plurality of setting values are stored in the memory, the controller first selects setting values suitable for the type of object to be welded and the shape of the region to be welded, and may select the selected setting values in the order of the highest number of previously applied times and apply the same to the vision camera.

On the other hand, when there is no pre-stored setting value in operation S26, the controller may individually adjust at least a portion of the setting parameters (S28). In operation S28, the controller may change at least one value among exposure time, gain, and sensitivity of the vision camera, color and brightness of a camera light source mounted on the vision camera. When the adjustment of the setting parameters is completed in operations S27 and S28, the controller may determine whether adjustment of the sample parameters is necessary by performing operations S21 to S25 again.

As an example, in a sample image obtained by photographing a welding object with a vision camera to which the setting parameters determined in operation S27 or operation S28 are applied, the controller may set regions of interest and obtain sample RGB values. When the difference between the sample RGB value and the reference RGB value is less than the reference difference, the controller may determine that the setting parameters are optimized, and may complete adjustment of the setting parameters (S29). On the other hand, when the sample RGB value generated from the sample image obtained by photographing the welding target region with the vision camera to which the setting parameters determined in operation S27 or S28 differs from the reference RGB value by the reference difference or more, the controller may re-adjust the sample parameters.

In this manner, the controller may adjust the setting parameters until the sample RGB value and the reference RGB value match or the difference between the sample RGB value and the reference RGB value is smaller than the reference difference. Therefore, after the adjustment of the setting parameters is completed, the welding target region may be accurately identified in the image of the welding object captured by the vision camera. The laser light is accurately irradiated to the welding target region, and the defect rate of the welding process may be reduced.

FIGS. 9 to 12 are views provided to describe the operation of the laser welding apparatus according to an embodiment.

Figure 9:
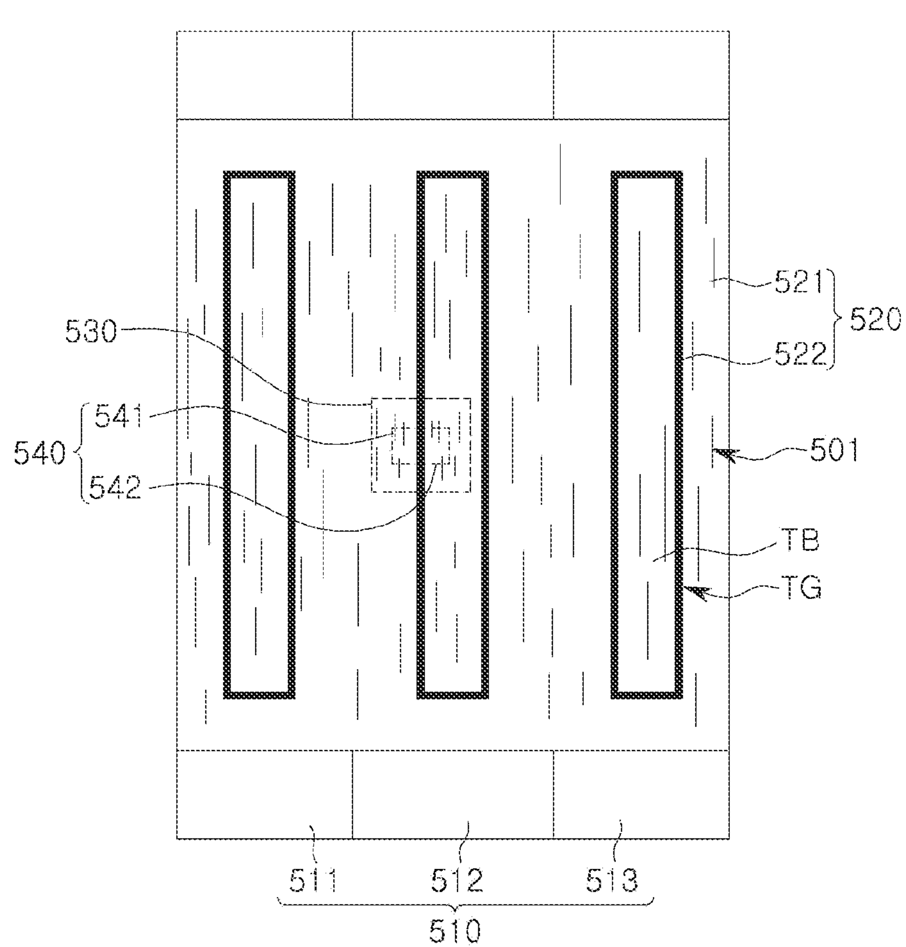
FIGS. 9 to 12 are views illustrating the operation of a laser welding apparatus according to an embodiment.

FIG. 9 may be an example of a sample image 500 of a battery module. Prior to capturing the sample image 500 according to an embodiment illustrated in FIG. 9, setting parameters of a vision camera included in the laser welding apparatus may be determined as default values. As described above with reference to FIG. 8, the battery module may include a plurality of battery cells 511 to 513 (510) and a bus bar 520. The bus bar 520 includes a bus bar plate 521 and a plurality of holes 522, and electrode tabs TB of the plurality of battery cells 510 may be respectively inserted into the plurality of holes 522. The electrode tabs TB inserted into the plurality of holes 522 in one bus bar 520 may be all positive electrodes, all negative electrodes, or may include a positive electrode and a negative electrode.

In the sample image 500 obtained by capturing the battery module by the vision camera in which default values are applied to the setting parameters, as illustrated in FIG. 9, scratches 501 present on the surface of the bus bar plate 521 and/or the electrode tab TB may be conspicuously expressed. Therefore, a welding target region TG defined between each of the plurality of holes 522 and the electrode tab TB may not be accurately identified.

To determine whether the welding target region TG is accurately identified, the controller of the laser welding apparatus may set a plurality of regions of interest 530 and 540 in the sample image 500. For example, the plurality of regions of interest 530 and 540 include a first region of interest 530 and second regions of interest 541-542: 540, and the second regions of interest 540 may be present within the first region of interest 530. The first region of interest 530 may be set to include points where the welding target region TG is estimated to exist.

On the other hand, before the laser welding process proceeds, a reference image may be stored in a memory that may be accessed by a controller of the laser welding apparatus. The reference image may be an image determined to accurately display the welding target region TG by the APA function. For example, the reference image may be an image obtained by photographing the battery module in a state in which setting parameters of the vision camera are set to values capable of accurately identifying the welding target region TG.

The controller may set a plurality of reference regions in the reference image in the same location as the plurality of regions of interest 530 and 540 defined in the sample image 500. The controller may compare the reference RGB values obtained from the plurality of respective reference regions with the sample RGB values obtained from the plurality of respective regions of interest 530 and 540.

Figure 10:
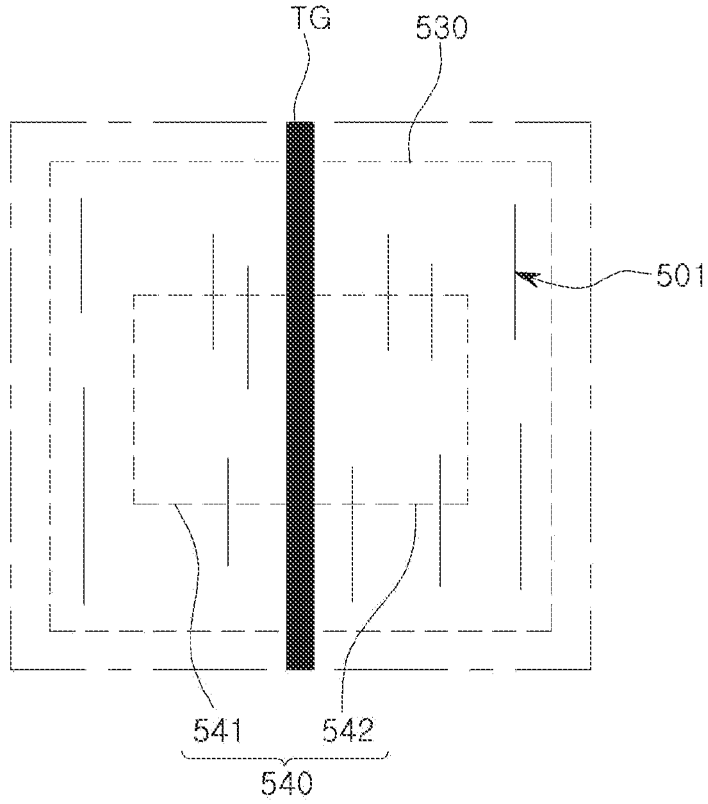

Referring to FIG. 10, which is an enlarged drawing of the plurality of regions of interest 530 and 540, as described above, scratches 501 and the like may be clearly displayed other than the welding target region TG. Therefore, if the reference RGB values obtained in the reference regions of the reference image in which only the welding target region TG is conspicuously displayed without the scratch 501 may have a great difference from the sample RGB values obtained in the plurality of regions of interest 530 and 540.

Figure 11:
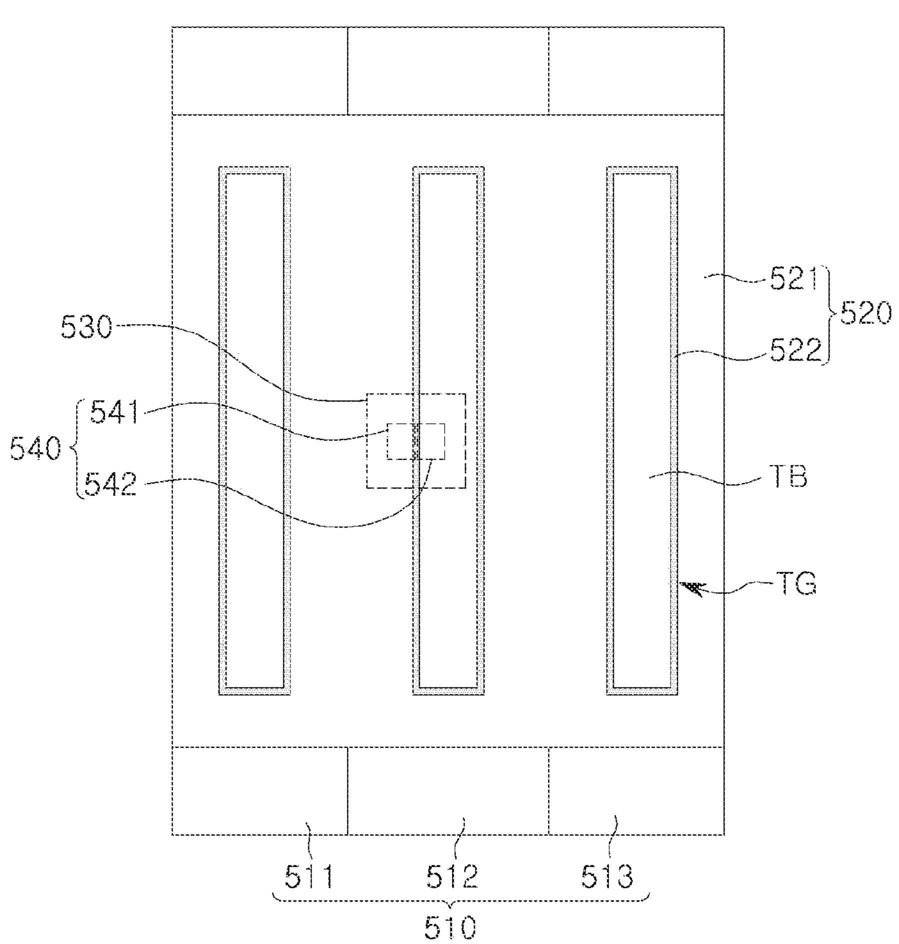

In this case, the controller may adjust at least some of the setting parameters of the vision camera, such that the scratches 501 are not displayed or displayed less clearly, and the welding target region TG is displayed more prominently. FIG. 11 may be an example of an image 500A in which the vision camera captures the battery module after the controller adjusts at least some of the setting parameters. For example, the controller may increase an ISO value corresponding to sensitivity or increase an exposure time to increase the overall brightness of the sample image 500.

Figure 12:
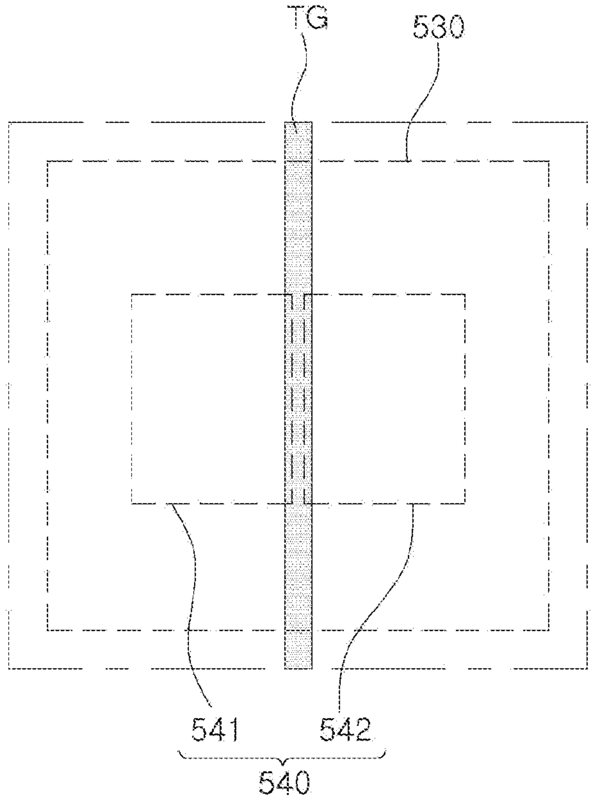

In this case, as in the image 500A according to an embodiment illustrated in FIG. 11, the brightness may increase and the scratch 501 may disappear. Referring to FIG. 12 illustrating the plurality of regions of interest 530 and 540 in FIG. 11, the brightness of the welding target region TG may also increase. However, since the welding target region TG is displayed to have a clear brightness difference from the adjacent second regions of interest 541 and 542, the controller may clearly identify the welding target region TG in the image 500A and control the laser light to be irradiated to the welding target region TG.

FIG. 13 is a diagram provided to illustrate a control method of a laser welding apparatus according to an embodiment.

FIG. 13 may be a look-up table stored in a memory included in the laser welding apparatus according to an embodiment. The look-up table may store a combination of setting parameters of the vision camera, for example, exposure time, gain, and sensitivity (ISO). When the laser welding apparatus is initially driven, the controller may apply each value of the setting parameters as a default setting value (DEF.). According to an embodiment, a plurality of look-up tables may be stored in the memory, and the plurality of look-up tables may be respectively applied to different welding targets or to different welding target regions.

The controller may obtain a sample image by photographing the welding object such that the welding target region is displayed in a state in which default setting values (DEF.) are applied to the setting parameters. Then, a plurality of regions of interest are set in the sample image, and a plurality of reference regions corresponding to a plurality of regions of interest may be set in a pre-stored reference image. The controller may compare the sample RGB value, which is the RGB average value of the plurality of respective regions of interest, with the reference RGB value, which is the RGB average value of the plurality of respective reference regions, and may thus determine whether the setting parameters of the vision camera are properly set.

When the difference between the sample RGB value and the reference RGB value is greater than the reference difference, the controller may change the setting parameters by selecting one of first to sixth setting values SET1 to SET6 instead of the default setting value DEF. For example, the controller may select the first to sixth setting values SET1 to SET6 in order of highest previous application count. When the setting parameters are changed, the welding object is photographed again with the vision camera to obtain a sample image, and it may be determined whether the sample parameters are optimized by comparing the sample RGB value generated from the reacquired sample image with the reference RGB value. When it is determined that the sample parameters are optimized, the controller may proceed with a welding process by radiating laser light to the welding target region identified in the image.

In an embodiment described with reference to FIG. 13, the gain of the vision camera is selectable as one of low gain (LOW) and high gain (HIGH), and values therebetween, and an ISO value representing sensitivity may be selected from values between 200 and 1600. On the other hand, the exposure time of the vision camera may be selected between 30 us and 1 s. However, this is only one example, and the number and type of setting parameters that may be adjusted by the controller depending on the specifications of the vision camera and the adjustable range of each setting parameter may vary.

As set forth above, in the laser welding apparatus according to an embodiment of the present disclosure, prior to performing the laser welding process, a vision camera may generate a sample image including a welding target region, a plurality of regions of interest may be selected from the sample image, and setting parameters of the vision camera may be adjusted to accurately identify the welding target region. Therefore, since the welding process is executed with the welding target region accurately specified, the yield of the laser welding process may be improved by resolving laser welding position defects caused by vision errors, and the defect rate of the entire battery manufacturing process may be reduced and simultaneously, the stability of the battery may be improved.

While example embodiments have been illustrated and described above, it will be apparent to those skilled in the art that modifications and variations could be made without departing from the scope of the present disclosure as defined by the appended claims.

What is claimed is:

1. A laser welding apparatus comprising:

a stage on which a first structure and a second structure are seated, the first structure and the second structure are targets of a laser welding process;

a vision camera located above the stage and configured to obtain a sample image displaying a welding target region in which the first structure and the second structure come into contact;

a controller configured to adjust setting parameters of the vision camera, and a welding part configured to irradiate a laser to the welding target region, wherein the controller obtains a sample RGB value from each of a plurality of regions of interest selected from the sample image, compares the sample RGB value with a reference RGB value obtained from each of a plurality of reference regions of interest defined in the same locations as the plurality of regions of interest in a predetermined reference image, adjusts at least one of the setting parameters, and sets the vision camera, wherein, when a difference between the sample RGB value and the reference RGB value is greater than a reference difference, the controller adjusts the at least one of the setting parameters by selecting one of a plurality of pre-stored setting values;

wherein the plurality of setting values are applied to the pre-stored setting parameters in descending order according to the number of times each of the plurality of pre-stored setting values has been previously applied; and wherein the controller determines the welding target region from a result image obtained by the vision camera, and controls the welding part such that the laser is irradiated to the welding target region.

2. The laser welding apparatus of claim 1, wherein the controller adjusts the at least one of the setting parameters such that the sample RGB value is included within a predetermined range including the reference RGB value.

3. The laser welding apparatus of claim 1, wherein the controller calculates a reference brightness from the reference RGB value, calculates a sample brightness from the sample RGB value, compares the reference brightness and the sample brightness, and adjusts at least one of the setting parameters.

4. The laser welding apparatus of claim 1, wherein the setting parameters include at least a portion of exposure, sensitivity, and an aperture value of the vision camera.

5. The laser welding apparatus of claim 4, wherein the controller adjusts the exposure of the vision camera by comparing the sample RGB value with the reference RGB value.

6. The laser welding apparatus of claim 1, wherein the first structure is an electrode tab of a battery cell, and the second structure is a bus bar structure.

7. The laser welding apparatus of claim 1, wherein the first structure is a lower case of a module housing in which a battery module is accommodated, and the second structure is an upper cover of the module housing.

8. The laser welding apparatus of claim 1, wherein the vision camera includes at least one light source radiating light to the stage, and the controller adjusts at least one of brightness and color of the light source by comparing the sample RGB value with the reference RGB value.

9. A method of controlling a laser welding apparatus, comprising:

seating a first structure and a second structure to be welded on a stage, for manufacturing a battery;

obtaining a sample image including a welding target region in which the first structure and the second structure contact each other, using a vision camera located above the stage;

obtaining a sample RGB value of each of a plurality of regions of interest adjacent to the welding target region, in the sample image;

acquiring a reference RGB value from each of a plurality of reference regions of interest defined on the same position as the plurality of regions of interest in a prestored reference image;

and adjusting at least one of setting parameters of the vision camera by comparing the sample RGB value with the reference RGB value;

wherein, when a difference between the sample RGB value and the reference RGB value is greater than a reference difference, the at least one of the setting parameters is adjusted by selecting one of a plurality of pre-stored setting values;

wherein the plurality of setting values are applied to the pre-stored setting parameters in descending order according to the number of times each of the plurality of pre-stored setting values has been previously applied;

determining the welding target region from a result image obtained by the vision camera; and controlling a welding part such that a laser by the welding part is irradiated to the welding target region.

10. The method of claim 9, wherein the controller is further configured to determine the welding target region by, after the vision camera is set such that the sample RGB value falls within a predetermined range from the reference RGB value, identifying a boundary between the first structure and the second structure as the welding target region while excluding one or more scratches present on a surface of the first structure or the second structure from the welding target region.

11. The method of claim 9, wherein the welding part is further configured to irradiate the laser to the welding target region by, controlling at least one of a laser light source, a mirror unit, and a lens to align an irradiation position of the laser with the welding target region.

* * * * *